C. E. STRONG.
PACKING.
APPLICATION FILED MAY 7, 1913.

1,086,240.

Patented Feb. 3, 1914.

Witnesses
Geo. L. Thom
Helen Van Etten

Inventor
Charles E. Strong
by Mason Fenwick Lawrence
Attorneys

UNITED STATES PATENT OFFICE.

CHARLES E. STRONG, OF AMITYVILLE, NEW YORK.

PACKING.

1,086,240. Specification of Letters Patent. Patented Feb. 3, 1914.

Application filed May 7, 1913. Serial No. 766,186.

*To all whom it may concern:*

Be it known that I, CHARLES E. STRONG, a citizen of the United States, residing at Amityville, in the county of Suffolk and State of New York, have invented certain new and useful Improvements in Packings; and I do hereby declare the following to be a full, clear, and exact description of the invention, such as will enable others skilled in the art to which it appertains to make and use the same.

This invention relates to packing and has for an object to provide a form of packing that will be most durable for use and most economical in manufacture.

Another object of this invention is to provide a packing made of sections so as to have the plies of material forming these sections disposed perpendicular to each other.

A further object of this invention is to provide a packing having that portion thereof which receives the wear as from a piston rod formed of plies of material disposed perpendicular to the movement of the moving body.

A further object of this invention is to provide a packing made of sections, which sections have the plies of material constituting said sections disposed at angles to each other and said sections being enveloped in a tube, which tube is reinforced where the greatest strain occurs thereon.

Figure 1:
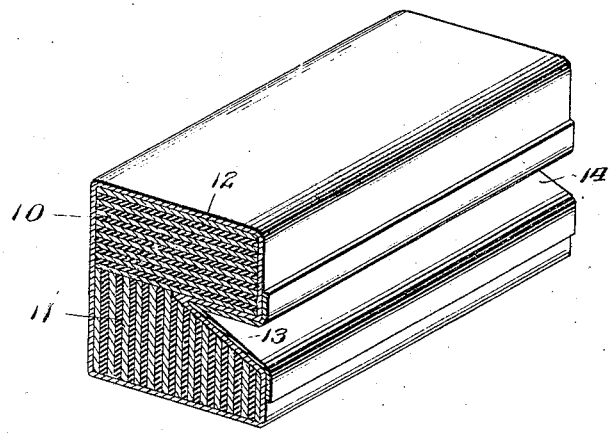
Figure 2:
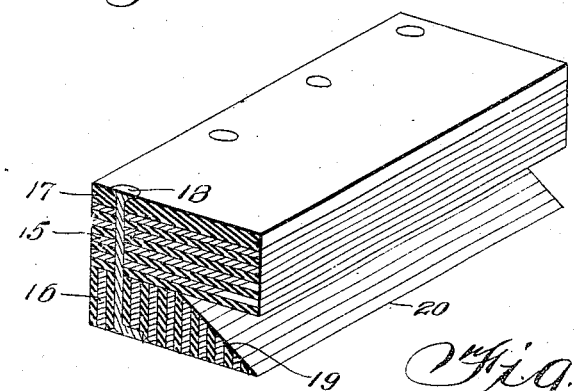

Further objects will be apparent from the following specification, appended claims and drawings in which, Figure 1 is a perspective view of one form of packing and Fig. 2 is a similar view for a modified form.

In packing of the type for which this form of invention is to be used, it is necessary that some provision be made to prevent the moving body such as a piston rod from tearing the packing from contact therewith and as it is only necessary to provide a small portion of said packing of the type for frictional engagement with the moving body, I provide such a portion of the desired size and dimensions to which portion I secure a backing of the necessary qualities to produce an efficient packing.

Referring to the drawings 10 indicates one of the sections forming the packing which section may be made of thin plies of material compressed to form a solid mass. This section has a section 11 secured thereto and the section 11 comprises plies of material such as alternate layers of mineral fabric and rubber, which plies are disposed perpendicular to the plies comprising section 10. These two sections are then enveloped in a tube 12 which by pressure is forced to adhere to the sections 10 and 11 as well as the recess formed therebetween by having a portion of the section 11 cut away as at 13. The tube 12 is reinforced as at 14 so as to strengthen the weakened portions of the packing.

Fig. 2 shows a modified form of this invention in which 15 indicates a section of backing, 16 a section adapted for engagement with a moving body such as a piston rod and 17 is a section of solid rubber secured to the sections 15 and 16 as by rivets or the like 18. The section 16 is cut away as at 19 to form an edge 20 which when in use is compressed against the piston rod or the like by pressure exerted against the cut away face 19.

Various modifications may be made within the scope of this invention without departing from the spirit thereof and

Having thus described my invention I claim:

1. In a packing, sections of material constituting said packing, said sections being of laminated formation, said sections being secured to one another, said sections being of different types of materials, one of said sections being cut away to form a recess between the two sections and said sections having their laminations at angles to one another.

2. In a packing, sections of laminated formation, said sections having their laminations at angles to one another, one of said sections being cut away to form a recess between the two sections said sections being of different degrees of hardness and fastening means for holding said sections together.

3. In a packing, sections of laminated formation secured to one another, one of said sections being cut away to form a recess between the two sections, a tubing enveloping said sections, and a reinforcement secured to said tube between the sections.

4. In a packing, sections of laminated formation secured to one another, one of said sections being adapted for engagement with a moving object, the laminations of said section being arranged substantially perpendicular to the line of movement of said object and the other of said sections being secured to said first mentioned section, said second mentioned section having its laminations perpendicular to the laminations in the first mentioned section, said second mentioned section being of a greater degree of hardness than the first mentioned section and said second mentioned section serving as a backing for said first mentioned section.

5. In a packing, sections of laminated formation secured to one another, the laminations of one section being perpendicular to those of the other section, one of said sections being of a greater degree of hardness than the other and a section of material secured to one of said sections, said section of material being more pliable than either of the sections of laminated formation.

In testimony whereof I affix my signature in presence of two witnesses.

CHARLES E. STRONG.

Witnesses:
 LOUIS C. KISELKA,
 JOSEPH A. LAMPE.